(12) United States Patent
Hewinson

(10) Patent No.: US 8,588,821 B1
(45) Date of Patent: Nov. 19, 2013

(54) TECHNIQUES FOR AUTOMATICALLY OUTPUTTING SEVERE WEATHER NOTIFICATIONS AT A USER'S MOBILE COMPUTING DEVICE

(71) Applicant: Google Inc., Mountain View, CA (US)

(72) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/646,821

(22) Filed: Oct. 8, 2012

(51) Int. Cl.
*H04W 24/00* (2009.01)

(52) U.S. Cl.
USPC ............... 455/456.3; 455/414.1; 455/414.2; 455/414.3; 455/418; 455/432.1; 455/456.1; 455/456.2; 455/550.1; 455/566; 455/569.1; 340/601; 340/602; 340/687; 701/400; 701/408; 701/409; 701/410; 707/705

(58) Field of Classification Search
USPC ............... 455/414.1, 414.2, 414.3, 418–420, 455/432.1, 550.1, 566, 569.2, 456.1–457; 340/601, 602, 687; 701/200, 204, 211; 707/705
See application file for complete search history.

(56) References Cited

U.S. PATENT DOCUMENTS

| | | | |
|---|---|---|---|
| 6,611,687 B1 * | 8/2003 | Clark et al. ................. | 455/456.5 |
| 6,944,539 B2 | 9/2005 | Yamada et al. | |
| 7,206,837 B2 | 4/2007 | Seligmann | |
| 7,752,188 B2 | 7/2010 | Lagerstedt et al. | |
| 8,044,810 B2 * | 10/2011 | Delia et al. ................... | 340/601 |
| 2005/0272412 A1 * | 12/2005 | Langsenkamp et al. ... | 455/414.2 |
| 2009/0192702 A1 | 7/2009 | Bourne | |
| 2010/0313149 A1 * | 12/2010 | Zhang et al. .................. | 715/760 |
| 2011/0319064 A1 * | 12/2011 | Lenart et al. .................. | 455/418 |

\* cited by examiner

*Primary Examiner* — Steve D Agosta
(74) *Attorney, Agent, or Firm* — Troutman Sanders LLP; James E. Schutz; Jay R. Anderson

(57) ABSTRACT

A computer-implemented technique includes receiving, at a mobile computing device including one or more processors, an input from a user, the input indicating a weather severity threshold for providing a notification at the mobile computing device. The technique includes determining one or more locations where the mobile computing device is likely to be, indicative of a likely location of a user, during a future period of time based on user-related data. The technique includes receiving a weather prediction for the future period of time for each of the one or more locations. The technique also includes automatically outputting the notification when the weather prediction for at least one of the one or more locations exceeds the weather severity threshold and at a time depending on distances between the one of more locations and a home location of the user.

26 Claims, 5 Drawing Sheets

TECHNIQUES FOR AUTOMATICALLY OUTPUTTING SEVERE WEATHER NOTIFICATIONS AT A USER'S MOBILE COMPUTING DEVICE

BACKGROUND

A mobile computing device (a laptop computer, a tablet computer, a mobile phone, etc.) can be configured to provide weather information to a user. The mobile computing device can provide its location to a weather service provider via a network. The weather service provider can then provide the weather information corresponding to the location to the mobile computing device via the network. For example, the weather information can include current weather information for the location and/or a weather prediction for the location for a future period of time.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented technique is presented. The technique can include receiving, at a mobile computing device including one or more processors, an input from a user, the input indicating a weather severity threshold for providing a notification at the mobile computing device. The technique can include determining, at the mobile computing device, one or more locations where the mobile computing device is likely to be, indicative of a likely location of a user, during a future period of time based on user-related data. The technique can include receiving, at the mobile computing device, a weather prediction for the future period of time for each of the one or more locations. The technique can also include automatically outputting, at the mobile computing device, the notification when the weather prediction for at least one of the one or more locations exceeds the weather severity threshold and: (i) at a first time when none of the one or more locations is greater than a distance threshold from a home location of the user, and (i) at a second time when at least one of the one or more locations is greater than the distance threshold from the home location the user, wherein the second time is before the first time.

In some embodiments, automatically outputting the notification includes outputting, at the mobile computing device, the notification by overriding or interrupting any applications or processes currently being executed by the mobile computing device.

In other embodiments, automatically outputting the notification includes outputting, at the mobile computing device, a pop-up window including the notification.

In some embodiments, automatically outputting the notification includes: generating, at the mobile computing device, an electronic message including the notification, and outputting, at the mobile computing device, the electronic message.

In other embodiments, the input indicates first and second weather severity thresholds for providing the notification at the mobile computing device, wherein the second weather severity threshold is more severe than the first weather severity threshold, and wherein the notification is automatically output at the mobile computing device at least one of: (i) at a third time when the weather prediction for at least one of the one or more locations exceeds the first weather severity threshold, and (ii) at a fourth time when the weather prediction for at least one of the one or more locations exceeds the second weather severity threshold, wherein the fourth time is before the third time.

In some embodiments, the notification further includes a recommendation relating to the weather prediction that exceeds the weather severity threshold, and wherein the recommendation identifies at least one of (i) a recommended article of clothing for the user based on the weather prediction and (ii) a device for assisting the user with respect to the weather prediction that exceeds the weather severity threshold.

In other embodiments, determining the one or more locations where the mobile computing device is likely to be during the future period of time is further based on at least of a plurality of software applications associated with the user, the plurality of software applications including (i) a calendar application, (ii) a travel application, and (iii) an aggregation application.

In some embodiments, the technique further includes determining whether any of the one or more locations that are greater than the distance threshold from the home location of the user are associated with a multiple-day trip by the user using the at least one of the plurality of software applications, wherein when a specific location is associated with a multiple day trip, the second time is before the user is scheduled to leave for the multiple-day trip according to the at least one of the plurality of software applications.

In other embodiments, the weather prediction includes (i) a weather condition prediction and (ii) a parameter prediction associated with the weather condition prediction, wherein the weather severity threshold indicates an amount of deviation from an average parameter associated with the weather condition prediction, and wherein automatically outputting the notification at the second time is based on whether the parameter prediction for the location greater than the distance threshold from the home location of the user is greater than the weather severity threshold from the average parameter for that location.

In some embodiments, the user-related data includes at least one of (i) one or more repeat locations associated with the user and (ii) one or more movement patterns associated with the user, and wherein determining the one or more locations that the mobile computing device is likely to be during a future period based on the user-related data includes: determining, at the mobile computing device, one or more possible locations that the mobile computing device is likely to be, indicative of a likely location of the user, during the future time period based on the user-related data, determining, at the mobile computing device, a probability score for each of the one or more possible locations using a machine learning algorithm, wherein a specific probability score is indicative of a likelihood that the mobile computing device is at a specific location during the future time period, and selecting, at the mobile computing device, each of the one or more possible locations having a probability score greater than a probability score threshold to obtain the one or more locations, wherein the probability score threshold is indicative of an acceptable likelihood that the mobile computing device is at the specific location during the future time period.

A mobile computing device is also presented. The mobile computing device can include a communication device, one or more processors, and a user interface. The communication device can be configured to receive an input from a user, the input indicating a weather severity threshold for providing a notification at the mobile computing device. The one or more processors can be configured to determine one or more locations where the mobile computing device is likely to be, indicative of a likely location of a user, during a future period of time based on user-related data. The user interface can be configured to automatically output the notification when a weather prediction for at least one of the one or more locations exceeds the weather severity threshold and: (i) at a first time when none of the one or more locations is greater than a distance threshold from a home location of the user, and (i) at a second time when at least one of the one or more locations is greater than the distance threshold from the home location the user, wherein the second time is before the first time. The communication device can be further configured to receive the weather prediction for the future period of time for each of the one or more locations.

In some embodiments, the user interface is configured to automatically output the notification by overriding or interrupting any applications or processes currently being executed by the mobile computing device.

In other embodiments, the user interface is configured to automatically output the notification via a pop-up window including the notification.

In some embodiments, the one or more processors are further configured to generate an electronic message including the notification, and wherein the user interface is configured to automatically outputting the notification by outputting the electronic message.

In other embodiments, the input indicates first and second weather severity thresholds for providing the notification at the mobile computing device, wherein the second weather severity threshold is more severe than the first weather severity threshold, and wherein the user interface is configured to automatically output the notification at least one of: (i) at a third time when the weather prediction for at least one of the one or more locations exceeds the first weather severity threshold, and (ii) at a fourth time when the weather prediction for at least one of the one or more locations exceeds the second weather severity threshold, wherein the fourth time is before the third time.

In some embodiments, the notification further includes a recommendation relating to the weather prediction that exceeds the weather severity threshold, and wherein the recommendation identifies at least one of (i) a recommended article of clothing for the user based on the weather prediction and (ii) a device for assisting the user with respect to the weather prediction that exceeds the weather severity threshold.

In other embodiments, the one or more processors are configured to determine the one or more locations where the mobile computing device is likely to be during the future period of time further based on at least of a plurality of software applications associated with the user, the plurality of software applications including (i) a calendar application, (ii) a travel application, and (iii) an aggregation application.

In some embodiments, the one or more processors are further configured to determine whether any of the one or more locations that are greater than the distance threshold from the home location of the user are associated with a multiple-day trip by the user using the at least one of the plurality of software applications, wherein when a specific location is associated with a multiple day trip, the second time is before the user is scheduled to leave for the multiple-day trip according to the at least one of the plurality of software applications.

In other embodiments, the weather prediction includes (i) a weather condition prediction and (ii) a parameter prediction associated with the weather condition prediction, wherein the weather severity threshold indicates an amount of deviation from an average parameter associated with the weather condition prediction, and wherein the user interface is configured to automatically outputting the notification at the second time based on whether the parameter prediction for the location greater than the distance threshold from the home location of the user is greater than the weather severity threshold from the average parameter for that location.

In some embodiments, the user-related data includes at least one of (i) one or more repeat locations associated with the user and (ii) one or more movement patterns associated with the user, and wherein the one or more processors are configured to determine the one or more locations that the mobile computing device is likely to be during a future period based on the user-related data by: determining one or more possible locations that the mobile computing device is likely to be, indicative of a likely location of the user, during the future time period based on the user-related data, determining a probability score for each of the one or more possible locations using a machine learning algorithm, wherein a specific probability score is indicative of a likelihood that the mobile computing device is at a specific location during the future time period, and selecting each of the one or more possible locations having a probability score greater than a probability score threshold to obtain the one or more locations, wherein the probability score threshold is indicative of an acceptable likelihood that the mobile computing device is at the specific location during the future time period.

A non-transitory computer-readable medium is also presented. The computer-readable medium can have instructions stored thereon that, when executed by one or more processors of a mobile computing device, causes the mobile computing device to perform operations. The operations can include receiving an input from a user, the input indicating a weather severity threshold for providing a notification at the mobile computing device. The operations can include determining one or more locations where the mobile computing device is likely to be, indicative of a likely location of a user, during a future period of time based on user-related data. The operations can include receiving a weather prediction for the future period of time for each of the one or more locations. The operations can also include automatically outputting the notification when the weather prediction for at least one of the one or more locations exceeds the weather severity threshold and: (i) at a first time when none of the one or more locations is greater than a distance threshold from a home location of the user, and (i) at a second time when at least one of the one or more locations is greater than the distance threshold from the home location the user, wherein the second time is before the first time.

In some embodiments, automatically outputting the notification includes outputting the notification by overriding or interrupting any applications or processes currently being executed by the mobile computing device.

In other embodiments, automatically outputting the notification includes outputting a pop-up window including the notification.

In some embodiments, automatically outputting the notification includes: generating an electronic message including the notification, and outputting the electronic message.

In other embodiments, the input indicates first and second weather severity thresholds for providing the notification at the mobile computing device, wherein the second weather severity threshold is more severe than the first weather severity threshold, and wherein the notification is automatically output at the mobile computing device at least one of: (i) at a third time when the weather prediction for at least one of the one or more locations exceeds the first weather severity threshold, and (ii) at a fourth time when the weather prediction for at least one of the one or more locations exceeds the second weather severity threshold, wherein the fourth time is before the third time.

In some embodiments, the notification further includes a recommendation relating to the weather prediction that exceeds the weather severity threshold, and wherein the recommendation identifies at least one of (i) a recommended article of clothing for the user based on the weather prediction and (ii) a device for assisting the user with respect to the weather prediction that exceeds the weather severity threshold.

In other embodiments, determining the one or more locations where the mobile computing device is likely to be during the future period of time is further based on at least of a plurality of software applications associated with the user, the plurality of software applications including (i) a calendar application, (ii) a travel application, and (iii) an aggregation application.

In some embodiments, the operations further include determining whether any of the one or more locations that are greater than the distance threshold from the home location of the user are associated with a multiple-day trip by the user using the at least one of the plurality of software applications, wherein when a specific location is associated with a multiple day trip, the second time is before the user is scheduled to leave for the multiple-day trip according to the at least one of the plurality of software applications.

In other embodiments, the weather prediction includes (i) a weather condition prediction and (ii) a parameter prediction associated with the weather condition prediction, wherein the weather severity threshold indicates an amount of deviation from an average parameter associated with the weather condition prediction, and wherein automatically outputting the notification at the second time is based on whether the parameter prediction for the location greater than the distance threshold from the home location of the user is greater than the weather severity threshold from the average parameter for that location.

In some embodiments, the user-related data includes at least one of (i) one or more repeat locations associated with the user and (ii) one or more movement patterns associated with the user, and wherein determining the one or more locations that the mobile computing device is likely to be during a future period based on the user-related data includes: determining one or more possible locations that the mobile computing device is likely to be, indicative of a likely location of the user, during the future time period based on the user-related data, determining a probability score for each of the one or more possible locations using a machine learning algorithm, wherein a specific probability score is indicative of a likelihood that the mobile computing device is at a specific location during the future time period, and selecting each of the one or more possible locations having a probability score greater than a probability score threshold to obtain the one or more locations, wherein the probability score threshold is indicative of an acceptable likelihood that the mobile computing device is at the specific location during the future time period.

Further areas of applicability of the present disclosure will become apparent from the detailed description provided hereinafter. It should be understood that the detailed description and specific examples are intended for purposes of illustration only and are not intended to limit the scope of the disclosure.

Figure 1:
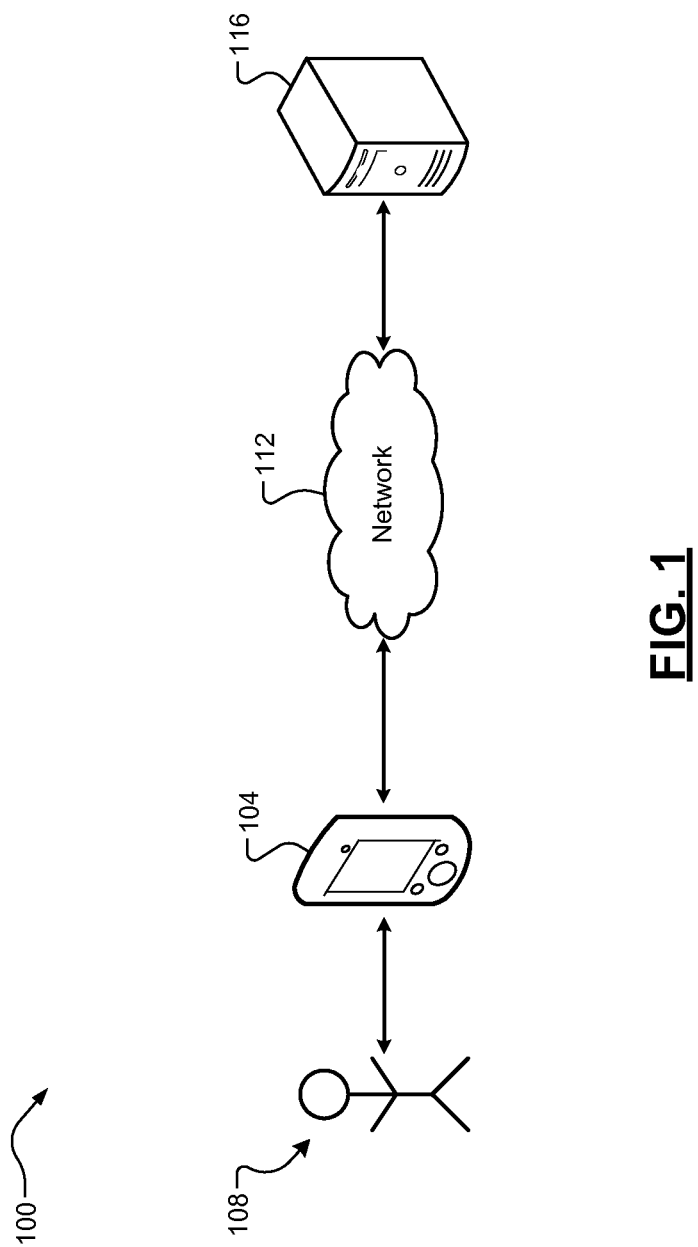
FIG. 1 is a diagram of a computing network including an example mobile computing device according to some implementations of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

As previously mentioned, a mobile computing device can be configured to provide weather information to a user. The weather information, however, is only related to a current location of the mobile computing device. The user may travel with the mobile computing device to a different location during the future period of time, and therefore the weather prediction may not be particularly useful to the user in the future. Furthermore, the weather information may only be provided to the mobile computing device in response to an explicit request by the user. The user, therefore, may be unaware of changes in the current weather and/or the weather prediction. Inaccurate weather information or the lack of weather information can cause the user to improperly plan for the future period of time.

In particular, the user may improperly plan for severe weather. Severe weather can refer to weather exceeding a weather severity threshold. Examples of severe weather can include extreme heat or cold, extreme wind, extreme rain or snow, tropical storms, and hurricanes. Severe weather can also refer to weather that is more than a predetermined amount, e.g., standard deviations(s) from a normal weather condition. For example only, severe weather could include more than a predetermined number of degrees above or below an average temperature for a location in a particular month or season. Further, the user may be more likely to improperly plan for severe weather when traveling a large distance from home, e.g., on cross-country trip, and/or for an extended period of time, e.g., multiple weeks.

Accordingly, techniques are presented for automatically outputting severe weather notifications at a user's mobile computing device. The techniques can generally provide for more accurate and more useful weather information for a user. According to the techniques of the present disclosure, a server can provide a weather prediction for one or more locations specified by the mobile computing device. The one or more locations can each be a location at which the mobile computing device is likely to be, indicative of a likely location of the user, during a period of time, e.g., the next 24 hours. Using one or more weather severity thresholds, the mobile computing device can automatically output a notification when the weather prediction for at least one of the one or more locations exceeds at least one of the one or more weather severity thresholds. Rather, the notification can be automatically output at the mobile computing device without any additional input or interaction by the user. For example only, the notification can override other processes because the notification can occur at a system level or at a background process and/or the notification can be provided via a pop-up window or electronic message.

The mobile computing device can also vary the time at which the notification is output depending on the severity of the weather prediction and/or a distance of the locations(s) from a home of the user. Further, the mobile computing device can also provide a recommendation associated with the notification. For example, an extreme cold notification may be accompanied by a recommendation to bring or pack warm clothes. While the techniques of the present disclosure are described as being executed at the user's mobile computing device, it should be appreciated that the techniques of the present disclosure can also be implemented at one or more servers, which can provide the notification(s) and, in some cases, the recommendation(s) to the user's mobile computing device via a network.

Referring now to FIG. 1, a diagram of a computing network 100 including an example mobile computing device 104 according to some implementations of the present disclosure is illustrated. It should be appreciated that the term "mobile computing device" as used herein can refer to any suitable mobile computing device including one or more processors (a laptop computer, a tablet computer, a mobile phone, etc.). A user 108 can interact with the mobile computing device 104. The user 108 can also transport the mobile computing device 104 (in his/her pocket, in a bag, etc.). The mobile computing device 104 can be configured to communicate with other computing devices via a network 112. The network 112 can include a local area network (LAN), a wide area network (WAN), e.g., the Internet, a mobile telephone network, or a combination thereof.

Specifically, the mobile computing device 104 can communicate with a server 116 via the network 112. It should be appreciated that the term "server" as used herein can refer to two or more servers operating in a parallel or distributed architecture. The server 116 can provide weather information for one or more specified locations to the mobile computing device 104 via the network 112. The one or more specified locations can be transmitted by the mobile computing device 104 to the server 116. For example, the one or more specified locations can include one or more locations that the mobile computing device 104 (and, therefore, the user 108) is likely to be during a future period. In some implementations, the server 116 can provide the weather information for the one or more specified locations in response to a request from the mobile computing device 104. Alternatively, the server 116 may provide the weather information for the one or more specified locations automatically at predetermined intervals, e.g., every few hours.

Figure 2:
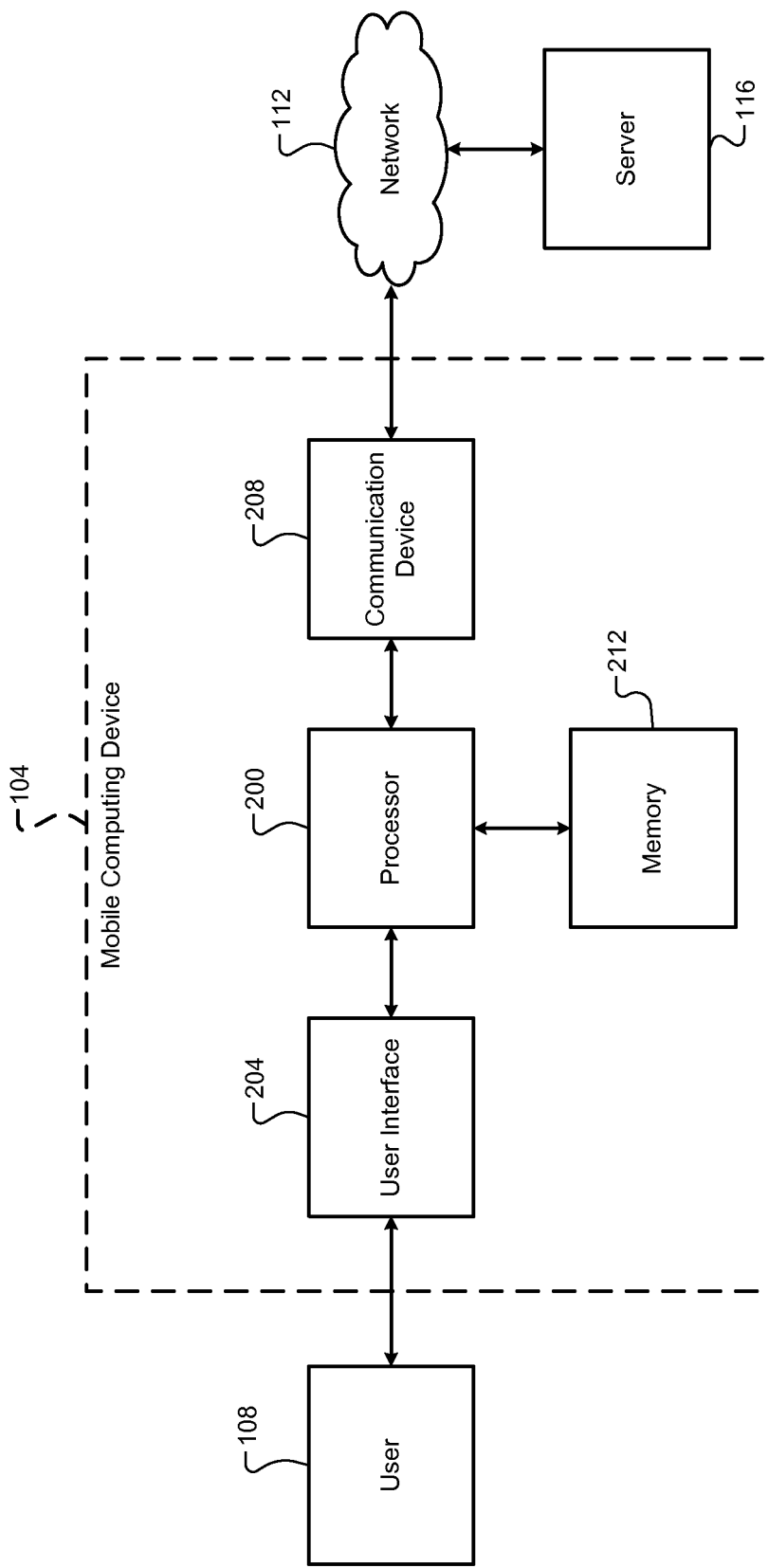
FIG. 2 is a functional block diagram of the example mobile computing device of FIG. 1.

Referring now to FIG. 2, a functional block diagram of the example mobile computing device 104 of FIG. 1 is illustrated. The mobile computing device 104 can include a processor 200, a user interface 204, a communication device 208, and a memory 212. The processor 200 can control operation of the mobile computing device 104. It should be appreciated that the term "processor" as used herein can refer to two or more processors operating in a parallel or distributed architecture. For example, the processor 200 can perform functions including, but not limited to loading/executing an operating system of the mobile computing device 104, processing information input/output via the user interface 204, processing information communicated over the network 112 via the communication device 208, and/or controlling read/write operations at the memory 212. The processor 200 can also be configured to execute the techniques according to some implementations of the present disclosure, as described more fully below.

The user interface 204 can include any suitable components for receiving input from and/or outputting information to the user 108 (a keyboard, a touch display, etc.). The communication device 208 can be configured for communication with other computing devices via the network 112. Specifically, the communication device 208 can be configured for communication with the server 116 via the network 112. The communication device 208 can include any suitable components for communication via the network 112, e.g., a transceiver. The memory 212 can include any suitable storage medium (flash, hard disk, etc.) configured to store information at the mobile computing device 104.

Initially, the processor 200 can determine one or more locations at which the user 108 is likely to be for the future period of time. The processor 200 can determine the one or more locations based on user-related data. It should be appreciated that the term "user-related data" as used herein can refer to any suitable data relating to the user 108 that can be used to determine likely location(s) of the mobile computing device 104 and, thus, the user 108. For example, the user-related data can include past activity of the user 108 (locations, movement patterns, etc.) and/or data retrieved from software applications associated with the user 108 (a calendar application, a travel application, an aggregation application, etc.). Any suitable location/pattern learning techniques can be used. For example, the techniques can use a global positioning satellite (GPS) system (not shown) of the mobile computing device 104.

In some embodiments, the processor 200 can monitor the movement of the user 108 over an extended period of time, e.g., a few months, in order to determine repeat locations and other activity patterns. For example only, the processor 200 can determine a location where the user 108 works by determining where the user 108 usually is located at repeated and regular intervals, e.g., between 9 am and 5 pm on weekdays. The processor 200 can also determine a home location of the user 108. Additionally, for example only, the processor 200 can determine a pattern that the user 108 goes golfing at a local golf course every other Saturday. All of this gathered information can be stored at the memory 212. In some implementations the gathered information obtained by monitoring the movement of the user 108 may be handled in a manner to protect the identity of the user 108. In other words, the identity of the user 108 may not be shared with other parties, e.g., the server 116. Additionally, for example, the gathered information may be deleted after being stored for a period of time.

The processor 200 can then determine the one or more locations for the future period of time using the gathered information (locations, patterns, etc.). The future period of time can be predetermined or specified by the user 108. For example only, the future period of time can be 24 hours. In some implementations, the processor 200 can determine the one or more possible locations that the user 108 is likely to be during the future time period based on the past activity of the user 108. The processor 200 can then determine a probability score for each of the one or more locations using a machine learning algorithm. A specific probability score can be indicative of a likelihood that the user 108 is at a specific location during the future time period. Finally, the processor 200 can then select each of the one or more possible locations having a probability score greater than a probability score threshold. The probability score threshold is indicative of an acceptable likelihood that the user 108 is at the specific location during the future time period. For example, the probability score threshold can be tuned or adjusted over time based on feedback, such as from the user 108.

After determining the one or more locations for the future period of time, the processor 200 can obtain weather predictions for the future period of time at each of the one or more locations. The processor 200 can obtain the weather predictions from the server 116 via the network 112 using the communication device 208. For example, the processor 200 can generate a request that indicates the future period of time and the one or more locations, which can be transmitted to the server 116 via the network 112 using the communication device 208. In response to the request, the server 116 may then transmit the weather prediction for the future period of time at each of the one or more locations to the communication device 208 via the network 112.

The processor 200 can then compare the weather prediction for the future period of time for each of the one or more locations to one or more weather severity thresholds. The one or more weather severity thresholds can be predetermined or input by the user 108 via the user interface 204. Additionally or alternatively, the server 116 may compare the weather prediction for the future period of time for each of the one or more locations to one or more weather severity thresholds. In this example, the server 116 may output a command to the mobile computing device 104 to automatically output a notification, as described more fully below.

As previously described, the weather severity thresholds can indicate extreme temperature (heat or cold), extreme wind, and/or extreme precipitation. Other weather conditions can also be implemented, such as extreme humidity. Severe weather can also refer to weather that is more than a predetermined amount, e.g., standard deviations(s) from a normal weather condition. The weather severity thresholds can be configurable by the user 108 because different users may have different tolerances for severe weather. For example only, the user 108 may feel that a temperature greater than 95 degrees is extreme heat, whereas a different user may feel that a temperature greater than 85 degrees is extreme heat.

Each weather prediction can include (i) a weather condition prediction and (ii) a parameter prediction associated with the weather condition prediction. The weather condition predication can indicate a prediction of a weather condition, e.g., rain. The weather condition prediction may also include a likelihood of that particular weather condition, e.g., 30%. The parameter prediction can indicate a prediction of a parameter associated with the weather condition, e.g., 20 miles per hour for the weather condition of wind. In some implementations, the processor 200 can compare the weather prediction(s) to weather severity thresholds indicative of amounts of deviation from an average parameter associated with the weather condition prediction. In other words, the processor 200 can determine whether the weather prediction(s) are more than a certain amount from average weather conditions at a particular location. For example, the average weather conditions may be particularly useful when the user 108 is planning a long-distance trip to a location where they have never visited (described in more detail later).

When the weather prediction for the future period of time for at least one of the one or more locations exceeds at least one of the one or more weather severity thresholds, the processor 200 can output a notification at the user interface 204. The notification can be used to notify the user 108 of the potential severe weather that they may encounter during the future period of time. The notification can generally be designed and/or provided in a manner to be distinguishable from a standard operating system or interface displayed at the user interface 204, and thus more likely to capture the attention of the user 108.

Specifically, the notification can be provided at a system level as opposed to an application level. In other words, the processor 200 can perform the techniques according to some implementations of the present disclosure as a background process to other applications, but the processor 200 can provide the notification(s) at the system level, thereby overriding or interrupting any application(s) or other processes currently executing at the mobile computing device 104. For example only, the notification may be an electronic message (text message, e-mail, etc.) that is generated by the processor 200 and output at the user interface 204. Alternatively, for example only, the notification may be presented in a pop-up window that appears in a top layer at the user interface 204.

In some implementations, the notification can further include a recommendation for the user 108 relating to the particular weather prediction that exceeds the weather severity threshold. The recommendation can be determined and generated by the processor 200 (or the server 116). The recommendation can also be provided in a same or similar manner as the notification, as described above. The recommendation for the user 108 may identify an article of clothing for the user 108. For example, for an extreme cold weather prediction, the recommendation may be for the user 108 to bring or pack warm clothes, such as a sweater. Additionally or alternatively, the recommendation for the user 108 may identify a device for assisting the user 108 with respect to the weather prediction that exceeds the weather severity threshold. For example, for an extreme precipitation weather prediction, the recommendation may be for the user 108 to bring or pack an umbrella.

One weather severity threshold can be used for each weather condition (temperature, wind, precipitation, etc.). More than one weather severity threshold may also be used for each weather condition. More specifically, two or more weather severity thresholds for a particular weather condition can correspond to different degrees of weather severity. For example, a first weather severity threshold may indicate extreme heat at a temperature of greater than 85 degrees and a second weather severity threshold may indicate extreme heat at a temperature of greater than 90 degrees. These different weather severity thresholds can be used to provide the notification to the user 108 at varying times. For example only, the notification can be provided at a first time and/or at a second time that is earlier than the first time. For example only, the first time can be specified by the user 108, such as at 7:30 am each morning before work. In some implementations, the first time and second time described above relating to different weather severity thresholds can be referred to as a third time and a fourth time, respectively, to distinguish these times from a first time and a second time for outputting the notification based on distances of the one or more locations from a home location of the user 108 (described in detail below).

For example, when the weather prediction exceeds the second weather severity threshold of 90 degrees, the processor 200 can output the notification at the user interface 204 at the second time than if the weather prediction only exceeded the first weather severity threshold of 85 degrees. If the notification is provided indicating weather prediction exceeds the second weather severity threshold of 90 degrees, another notification (that the predicated weather exceeds the first weather severity threshold) may or may not be output at the user interface 204 at the first time. For example, this repeat notification could be output as an additional reminder to the user 108 of the severity of the weather prediction.

In some implementations, the processor 200 can take into account distance from a home location of the user 108 and/or trip duration. In the case of a long-distance trip, the user 108 may need to plan based on the weather predictions at multiple locations during a day. Similarly, in the case of a multiple-day trip, the user 108 may need to plan based on the weather predictions for multiple days and, in some cases, multiple locations. The home location of the user 108 can be specified by the user 108 or automatically determined by the processor 200, e.g., a location where the user 108 is for a majority of the time or for a majority of nighttime periods.

The processor 200 can also determine the one or more locations where the user 108 is likely to be during the future period of time further based on at least one of a plurality of software applications associated with the user 108. For example only, the plurality of software applications can include a calendar application, a travel application, and an aggregation application. For example only, the processor 200 may retrieve electronic ticket (e-ticket) information associated with the user 108 from the travel application. It should be appreciated that the processor 200 can also determine the one or more locations where the user is likely to be during the future period of time based on other suitable software applications. The processor 200 can then determine whether any of the one or more locations are greater than a distance threshold from the home location of the user 108, which may be indicative of a long-distance trip. For example only, the distance threshold may be based on a maximum distance that an average user can travel by automobile during a day. The processor 200 can also determine whether any of the one or more locations that are greater than the distance threshold are associated with a multiple-day trip by the user 108 using the at least one of the plurality of software applications.

When a specific location is associated with a multiple day trip, the second time can be before the user 108 is scheduled to leave for the multiple-day trip according to the calendar. In other words, the notification(s) and, in some cases, the recommendation(s), can be provided to the user 108 before their trip. Further, as previously mentioned, the processor 200 can output the notification based on whether the parameter prediction for the location greater than the distance threshold from the home location of the user 108 is greater than the weather severity threshold from the average parameter for that location. For example only, a weather prediction of a mild temperature may be misleading when an average temperature for that location is actually 30 degrees higher, and therefore the user 108 may still be notified in order to help them pack the correct clothing for their trip.

Figure 3:
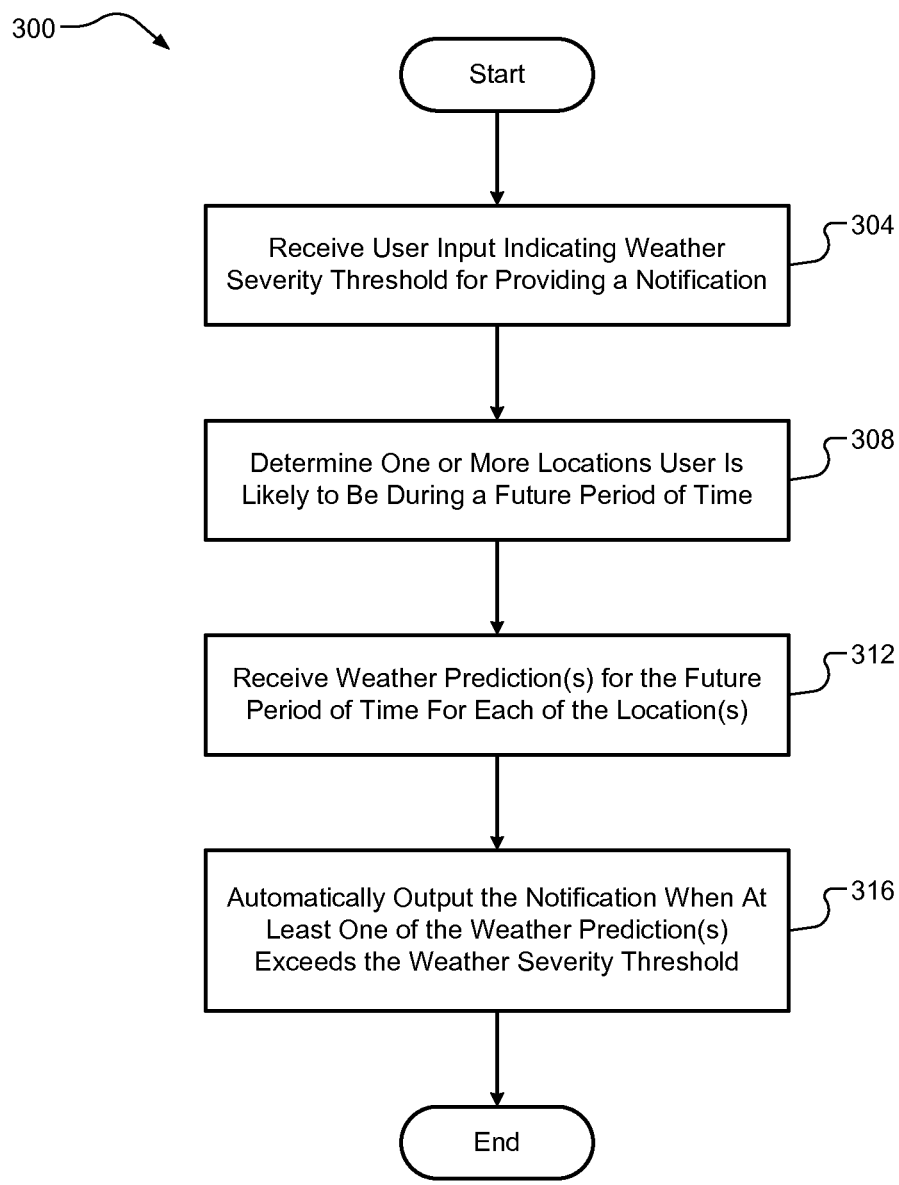
FIGS. 3-5 are flow diagrams of example techniques for automatically outputting severe weather notifications at a user's mobile computing device according to some implementations of the present disclosure.

Referring now to FIG. 3, a flow diagram of an example technique 300 for automatically outputting severe weather notifications at a user's mobile computing device is illustrated. At 304, the mobile computing device 104 can receive an input from the user 108 indicating a weather severity threshold for providing a notification at the mobile computing device 104. At 308, the mobile computing device 104 can determine one or more locations where the mobile computing device 104 is likely to be, indicative of a likely location of the user 108, during a future period of time based on the user-related data. At 312, the mobile computing device 104 can receive a weather prediction for the future period of time for each of the one or more locations, e.g., from the server 116 via the network 112. At 316, the mobile computing device 104 can automatically output the notification when the weather prediction for at least one of the one or more locations exceeds the weather severity threshold. The technique 300 can then end or return to 304 for one or more additional cycles.

Figure 4:
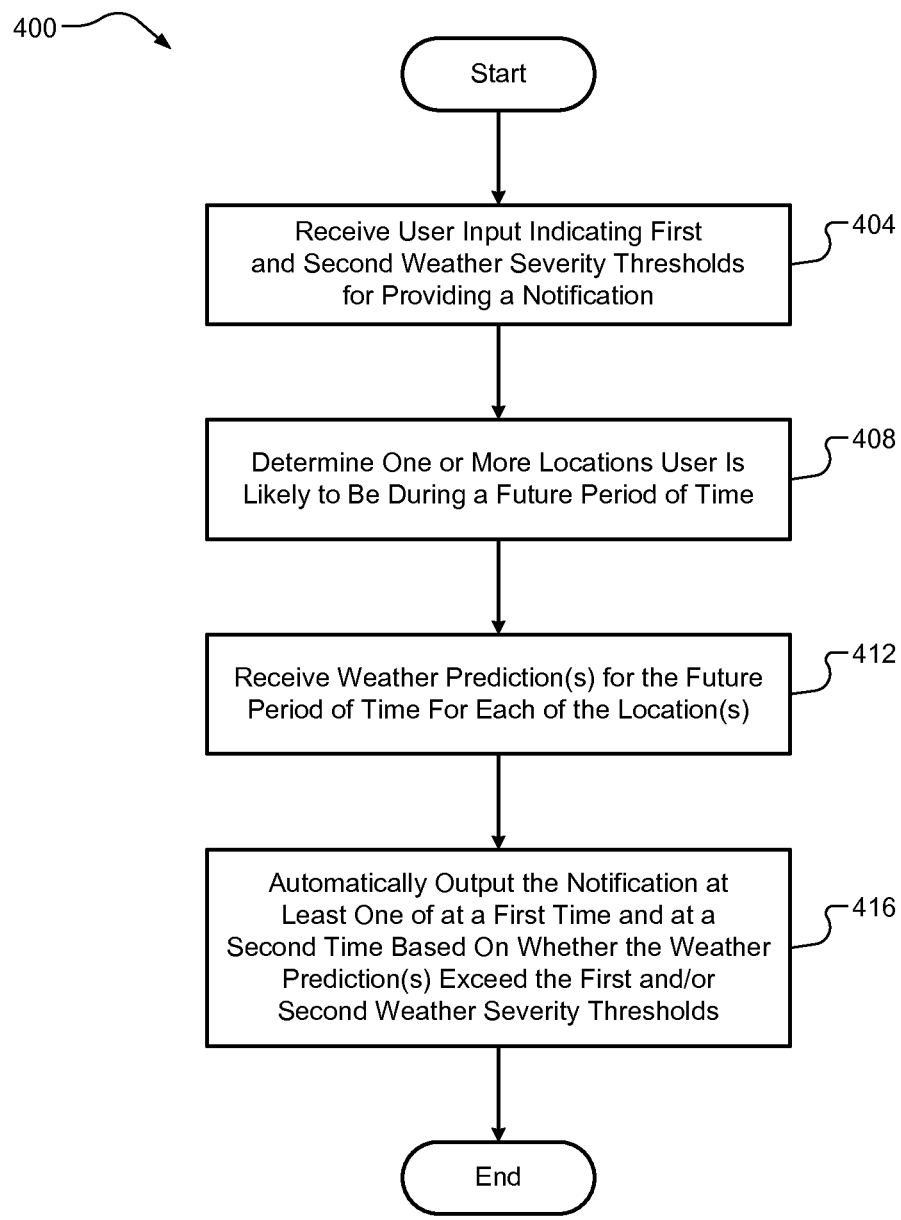

Referring now to FIG. 4, a flow diagram of another example technique 400 for automatically outputting severe weather notifications at a user's mobile computing device is illustrated. At 404, the mobile computing device 104 can receive an input from the user 108 indicating first and second weather severity thresholds for providing a notification at the mobile computing device 104. The second weather severity threshold can be more severe than the first weather severity threshold. At 408, the mobile computing device 104 can determine one or more locations where the mobile computing device 104 is likely to be, indicative of a likely location of the user 108, during a future period of time based on the user-related data. At 412, the mobile computing device 104 can receive a weather prediction for the future period of time for each of the one or more locations, e.g., from the server 116 via the network 112. At 416, the mobile computing device 104 can automatically output the notification at least one of: (i) at a first time when the weather prediction for at least one of the one or more locations exceeds the first weather severity threshold, and (ii) at a second time when the weather prediction for at least one of the one or more locations exceeds the second weather severity threshold. The second time can be before the first time. The technique 400 can then end or return to 404 for one or more additional cycles.

Figure 5:
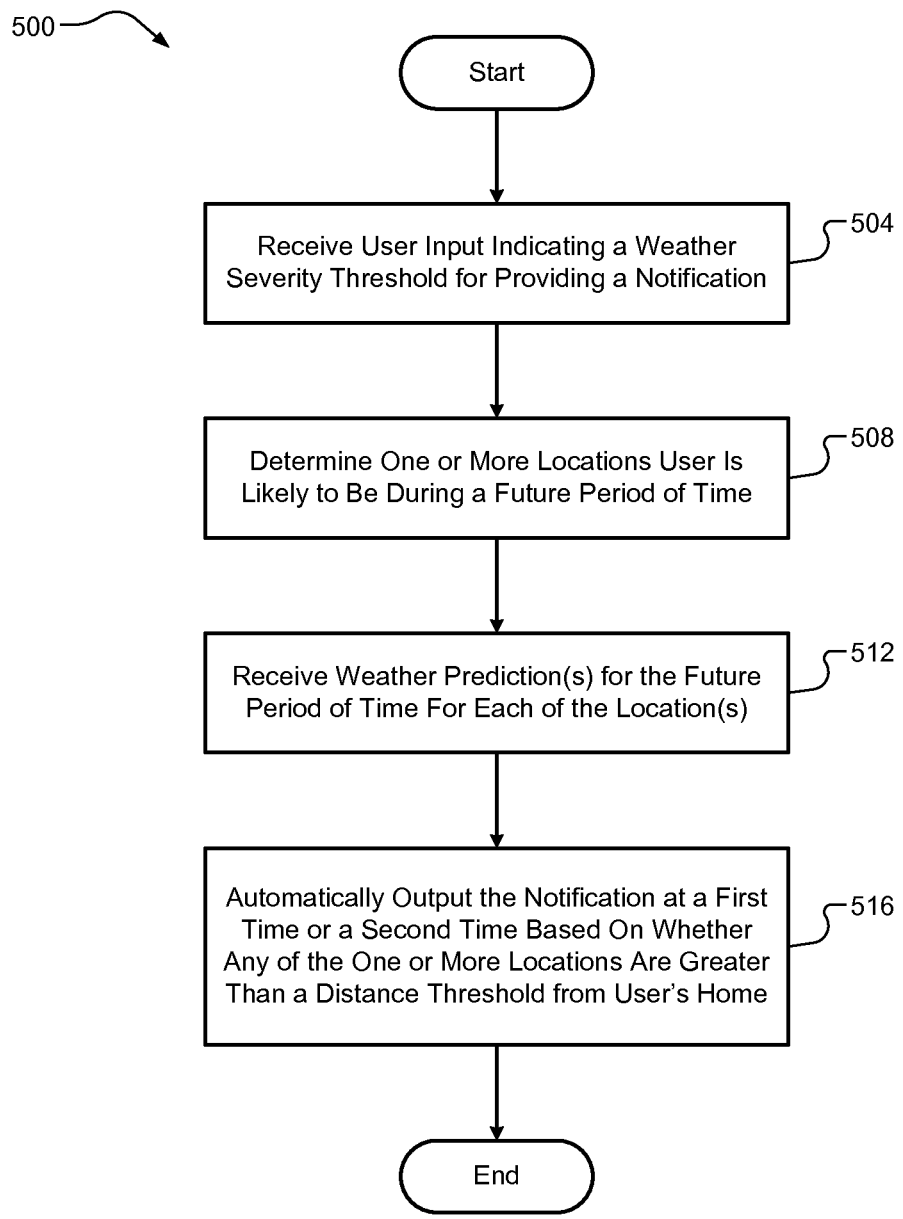

Referring now to FIG. 5, a flow diagram of another example technique 500 for automatically outputting severe weather notifications at a user's mobile computing device is illustrated. At 504, the mobile computing device 104 can receive an input from the user 108 indicating a weather severity threshold for providing a notification to the user 108. At 508, the mobile computing device 104 can determine one or more locations where the mobile computing device 104 is likely to be, indicative of a likely location of the user 108, during a future period of time based on the user-related data. At 512, the mobile computing device 104 can receive a weather prediction for the future period of time for each of the one or more locations, e.g., from the server 116 via the network 112. At 516, the mobile computing device 104 can automatically output the notification when the weather prediction for at least one of the one or more locations exceeds the weather severity threshold and: (i) at a first time when none of the one or more locations is greater than a distance threshold from a home location of the user 108, and (ii) at a second time when at least one of the one or more locations is greater than the distance threshold from the home of location the user 108. The second time can be before the first time. The technique 500 can then end or return to 504 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a mobile computing device including one or more processors, an input from a user, the input indicating a weather severity threshold for providing a notification at the mobile computing device;
   determining, at the mobile computing device, one or more locations where the mobile computing device is likely to be during a future period of time based on user-related data from at least one of a plurality of software applications associated with the user, the plurality of software applications including (i) a calendar application, (ii) a travel application, and (iii) an aggregation application;
   receiving, at the mobile computing device, a weather prediction for the future period of time for each of the one or more locations;
   determining, using the at least one of the plurality of software applications, whether any of the one or more locations that are greater than a distance threshold from a residence location of the user are associated with a multiple-day trip by the user; and automatically outputting, at the mobile computing device, the notification responsive to the weather prediction for at least one of the one or more locations exceeding the weather severity threshold, the automatically outputting occurring:
  (i) at a first time responsive to none of the one or more locations being greater than the distance threshold from the residence location of the user, and
  (ii) at a second time responsive to at least one of the one or more locations being greater than the distance threshold from the residence location of the user and associated with a multiple-day trip, wherein the second time is before the first time and before the user is scheduled, according to the at least one of the plurality of software applications, to leave for the multiple-day trip.

2. The computer-implemented method of claim 1, wherein automatically outputting the notification includes outputting, at the mobile computing device, the notification by overriding or interrupting any applications or processes currently being executed by the mobile computing device.

3. The computer-implemented method of claim 2, wherein automatically outputting the notification includes outputting, at the mobile computing device, a pop-up window including the notification.

4. The computer-implemented method of claim 2, wherein automatically outputting the notification includes:
  generating, at the mobile computing device, an electronic message including the notification; and outputting, at the mobile computing device, the electronic message.

5. The computer-implemented method of claim 1, wherein the input indicates first and second weather severity thresholds for providing the notification at the mobile computing device, wherein the second weather severity threshold is more severe than the first weather severity threshold, and wherein the notification is automatically output at the mobile computing device at least one of:
  (i) at a third time responsive to the weather prediction for at least one of the one or more locations exceeding the first weather severity threshold, and
  (ii) at a fourth time responsive to the weather prediction for at least one of the one or more locations exceeding the second weather severity threshold, wherein the fourth time is before the third time.

6. The computer-implemented method of claim 1, wherein the notification further includes a recommendation relating to the weather prediction that exceeds the weather severity threshold, and wherein the recommendation identifies at least one of (i) a recommended article of clothing for the user based on the weather prediction and (ii) a device for assisting the user with respect to the weather prediction that exceeds the weather severity threshold.

7. The computer-implemented method of claim 1, wherein the weather prediction includes (i) a weather condition prediction and (ii) a parameter prediction associated with the weather condition prediction, wherein the weather severity threshold indicates an amount of deviation from an average parameter associated with the weather condition prediction, and wherein automatically outputting the notification at the second time is based on whether the parameter prediction for the location greater than the distance threshold from the residence location of the user is greater than the weather severity threshold from the average parameter for that location.

8. The computer-implemented method of claim 1, wherein the user-related data includes at least one of (i) one or more repeat locations associated with the user and (ii) one or more movement patterns associated with the user, and wherein determining the one or more locations that the mobile computing device is likely to be during a future period based on the user-related data includes:
  determining, at the mobile computing device, one or more possible locations that the mobile computing device is likely to be during the future time period based on the user-related data;
  determining, at the mobile computing device, a probability score for each of the one or more possible locations using a machine learning algorithm, wherein a specific probability score is indicative of a likelihood that the mobile computing device is at a specific location during the future time period; and
  selecting, at the mobile computing device, each of the one or more possible locations having a probability score greater than a probability score threshold to obtain the one or more locations, wherein the probability score threshold is indicative of an acceptable likelihood that the mobile computing device is at the specific location during the future time period.

9. A mobile computing device, comprising:
a communication device configured to receive an input from a user, the input indicating a weather severity threshold for providing a notification at the mobile computing device, the weather severity threshold indicating an amount of deviation from an average parameter associated with a weather condition prediction;
one or more processors configured to determine one or more locations where the mobile computing device is likely to be during a future period of time based on user-related data; and
a user interface configured to automatically output the notification responsive to a weather prediction for at least one of the one or more locations exceeding the weather severity threshold, the weather prediction including (i) the weather condition prediction and (ii) a parameter prediction associated with the weather condition prediction, the automatically outputting occurring:
  (i) at a first time responsive to none of the one or more locations being greater than a distance threshold from a residence location of the user, and
  (ii) at a second time responsive to at least one of the one or more locations being greater than the distance threshold from the residence location of the user and the parameter prediction for the at least one of the one or more locations being greater than the distance threshold from the residence location of the user is greater than the weather severity threshold from the average parameter for that location, wherein the second time is before the first time, wherein the communication device is further configured to receive the weather prediction for the future period of time for each of the one or more locations.

10. The mobile computing device of claim 9, wherein the user interface is configured to automatically output the notification by overriding or interrupting any applications or processes currently being executed by the mobile computing device.

11. The mobile computing device of claim 10, wherein the user interface is configured to automatically output the notification via a pop-up window including the notification.

12. The mobile computing device of claim 10, wherein the one or more processors are further configured to generate an electronic message including the notification, and wherein the user interface is configured to automatically outputting the notification by outputting the electronic message.

13. The mobile computing device of claim 9, wherein the input indicates first and second weather severity thresholds for providing the notification at the mobile computing device, wherein the second weather severity threshold is more severe than the first weather severity threshold, and wherein the user interface is configured to automatically output the notification at least one of:
   (i) at a third time responsive to the weather prediction for at least one of the one or more locations exceeding the first weather severity threshold, and
   (ii) at a fourth time responsive to the weather prediction for at least one of the one or more locations exceeding the second weather severity threshold, wherein the fourth time is before the third time.

14. The mobile computing device of claim 9, wherein the notification further includes a recommendation relating to the weather prediction that exceeds the weather severity threshold, and wherein the recommendation identifies at least one of (i) a recommended article of clothing for the user based on the weather prediction and (ii) a device for assisting the user with respect to the weather prediction that exceeds the weather severity threshold.

15. The mobile computing device of claim 9, wherein the one or more processors are configured to determine the one or more locations where the mobile computing device is likely to be during the future period of time further based on at least of a plurality of software applications associated with the user, the plurality of software applications including (i) a calendar application, (ii) a travel application, and (iii) an aggregation application.

16. The mobile computing device of claim 15, wherein the one or more processors are further configured to determine whether any of the one or more locations that are greater than the distance threshold from the residence location of the user are associated with a multiple-day trip by the user using the at least one of the plurality of software applications, wherein when a specific location is associated with a multiple day trip, the second time is before the user is scheduled to leave for the multiple-day trip according to the at least one of the plurality of software applications.

17. The mobile computing device of claim 9, wherein the user-related data includes at least one of (i) one or more repeat locations associated with the user and (ii) one or more movement patterns associated with the user, and wherein the one or more processors are configured to determine the one or more locations that the mobile computing device is likely to be during a future period based on the user-related data by:
   determining one or more possible locations that the mobile computing device is likely to be during the future time period based on the user-related data;
   determining a probability score for each of the one or more possible locations using a machine learning algorithm, wherein a specific probability score is indicative of a likelihood that the mobile computing device is at a specific location during the future time period; and
   selecting each of the one or more possible locations having a probability score greater than a probability score threshold to obtain the one or more locations, wherein the probability score threshold is indicative of an acceptable likelihood that the mobile computing device is at the specific location during the future time period.

18. A non-transitory computer-readable medium having instructions stored thereon that, when executed by one or more processors of a mobile computing device, causes the mobile computing device to perform operations including:
   receiving an input from a user, the input indicating a weather severity threshold for providing a notification at the mobile computing device;
   determining one or more locations where the mobile computing device is likely to be during a future period of time based on user-related data, the user-related data including at least one of (i) one or more repeat locations associated with the user and (ii) one or more movement patterns associated with the user, and the determining the one or more locations including:
      determining one or more possible locations that the mobile computing device is likely to be during the future time period based on the user-related data;
      determining a probability score for each of the one or more possible locations using a machine learning algorithm, wherein a specific probability score is indicative of a likelihood that the mobile computing device is at a specific location during the future time period; and
      selecting each of the one or more possible locations having a probability score greater than a probability score threshold to obtain the one or more locations, wherein the probability score threshold is indicative of an acceptable likelihood that the mobile computing device is at the specific location during the future time period; and
   receiving a weather prediction for the future period of time for each of the one or more locations; and
   automatically outputting the notification responsive to the weather prediction for at least one of the one or more locations exceeding the weather severity threshold, the automatically outputting occurring:
      (i) at a first time responsive to none of the one or more locations being greater than a distance threshold from a residence location of the user, and
      (ii) at a second time responsive to at least one of the one or more locations being greater than the distance threshold from the residence location of the user, wherein the second time is before the first time.

19. The computer-readable medium of claim 18, wherein automatically outputting the notification includes outputting the notification by overriding or interrupting any applications or processes currently being executed by the mobile computing device.

20. The computer-readable medium of claim 19, wherein automatically outputting the notification includes outputting a pop-up window including the notification.

21. The computer-readable medium of claim 19, wherein automatically outputting the notification includes:
   generating an electronic message including the notification; and
   outputting the electronic message.

22. The computer-readable medium of claim 18, wherein the input indicates first and second weather severity thresholds for providing the notification at the mobile computing device, wherein the second weather severity threshold is more severe than the first weather severity threshold, and wherein the notification is automatically output at the mobile computing device at least one of:
   (i) at a third time responsive to the weather prediction for at least one of the one or more locations exceeding the first weather severity threshold, and
   (ii) at a fourth time responsive to the weather prediction for at least one of the one or more locations exceeding the second weather severity threshold, wherein the fourth time is before the third time.

23. The computer-readable medium of claim 18, wherein the notification further includes a recommendation relating to the weather prediction that exceeds the weather severity threshold, and wherein the recommendation identifies at least one of (i) a recommended article of clothing for the user based on the weather prediction and (ii) a device for assisting the user with respect to the weather prediction that exceeds the weather severity threshold.

24. The computer-readable medium of claim 18, wherein determining the one or more locations where the mobile computing device is likely to be during the future period of time is further based on at least of a plurality of software applications associated with the user, the plurality of software applications including (i) a calendar application, (ii) a travel application, and (iii) an aggregation application.

25. The computer-readable medium of claim 24, wherein the operations further include determining whether any of the one or more locations that are greater than the distance threshold from the residence location of the user are associated with a multiple-day trip by the user using the at least one of the plurality of software applications, wherein when a specific location is associated with a multiple day trip, the second time is before the user is scheduled to leave for the multiple-day trip according to the at least one of the plurality of software applications.

26. The computer-readable medium of claim 18, wherein the weather prediction includes (i) a weather condition prediction and (ii) a parameter prediction associated with the weather condition prediction, wherein the weather severity threshold indicates an amount of deviation from an average parameter associated with the weather condition prediction, and wherein automatically outputting the notification at the second time is based on whether the parameter prediction for the location greater than the distance threshold from the residence location of the user is greater than the weather severity threshold from the average parameter for that location.

* * * * *